Feb. 14, 1961 F. W. BOGGS 2,971,301
METHOD OF MAKING DRAG-REDUCING COVERING
Filed June 23, 1958
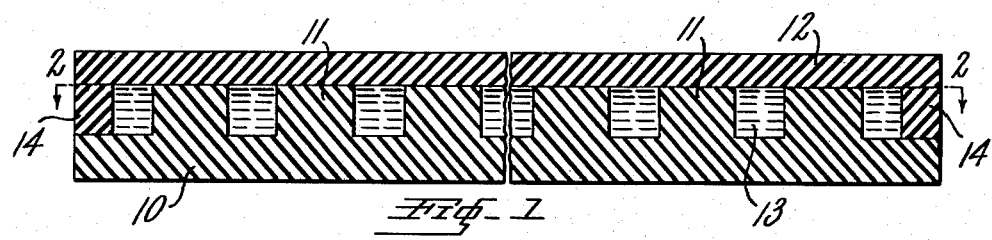
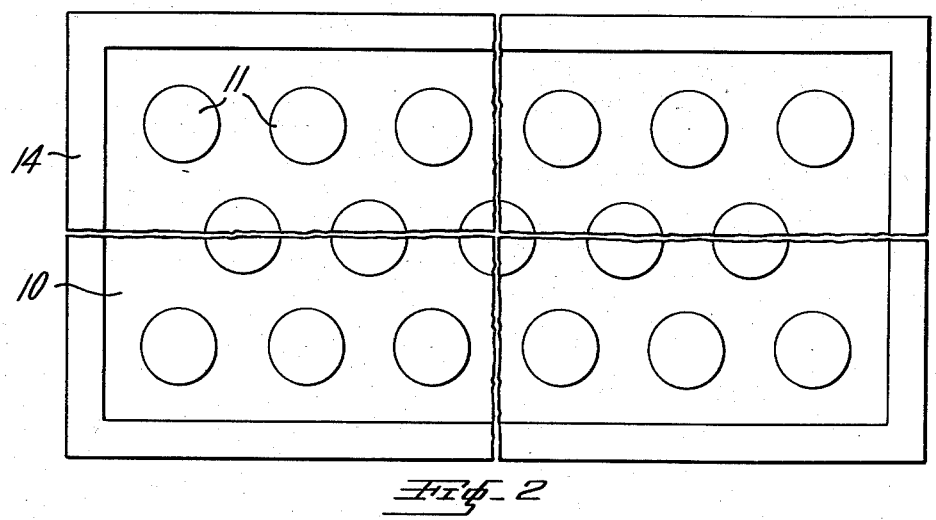
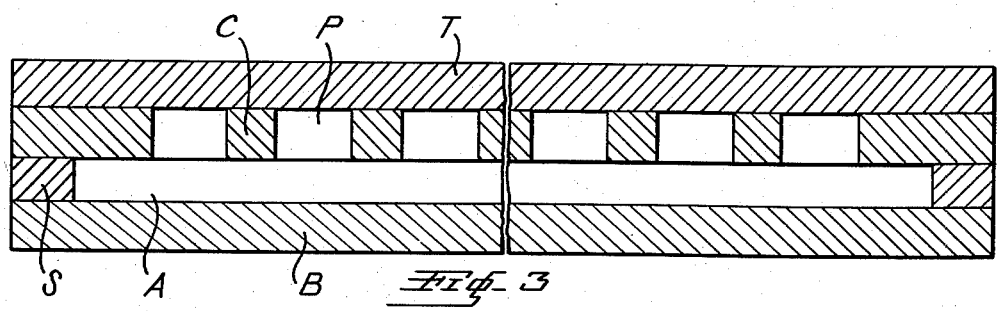
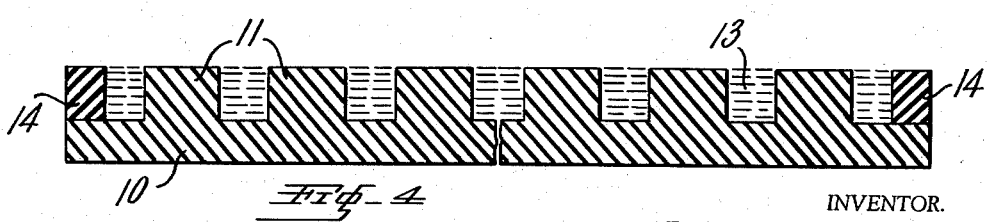
INVENTOR.
FITZHUGH W. BOGGS
BY
*Irwin M. Lewis*
ATTORNEY United States Patent Office 2,971,301
Patented Feb. 14, 1961

2,971,301

METHOD OF MAKING DRAG-REDUCING COVERING

Fitzhugh W. Boggs, Upper Montclair, N.J., assignor to United States Rubber Company, New York, N.Y., a corporation of New Jersey Filed June 23, 1958, Ser. No. 743,634

4 Claims. (Cl. 53—25)

This invention relates to a method of forming a covering to be applied to an object to reduce the frictional drag of the object during movement thereof in a fluid medium.

More particularly the invention relates to a method of forming a fluid-filled coating which will provide a damping function as generally described in United States application Serial No. 548,794, filed November 23, 1955, by Max O. Kramer.

The covering to which the instant invention is directed consists of a molded resilient rubber base having a multitude of small stubs protruding from one face thereof. The stubby side is in turn faced by a thin, resilient pressure-responsive diaphragm and the space between the diaphragm and the base is filled with a damping fluid of a specified viscosity. The thin diaphragm normally is faced outwardly of the object when the covering is applied to the object. As pointed out in said application, the use of a fluid-filled covering on objects moving through water can lead to substantial reductions (20 to 70%) in the frictional drag.

The primary object of the present invention is to provide a practical method of manufacturing a covering of the type described.

In accordance with the invention a rubber base is provided having a plurality of rubber stubs extending from one face thereof. A damming strip is provided around the peripheral edge of the base to retain liquid to be poured on the base. The damping liquid is poured on the base to substantially the depth of the stubs. The liquid is then frozen and the diaphragm adhered under pressure to the upper surfaces of the stubs and the damming strips. Adhesion under substantial pressure is possible without displacement of the liquid because of the frozen state of the liquid. By such a method very effective sealing of the liquid can be obtained.

The invention having been broadly described, a more detailed description is given hereafter with reference to the accompanying drawings wherein:

Fig. 1 is a partial sectional view, greatly enlarged, of the completed covering made in accordance with the present invention;

Fig. 2 is a sectional view taken on the line 2—2 of Fig. 1 to show the relative spacing of the stubs on the base;

Fig. 3 is a partial sectional view of a conventional mold for forming the base with integral stubs; and Fig. 4 is a partial sectional view of the base with the damming strips in place and the channels between the stubs of the base filled with the damping liquid preparatory to freezing the liquid and applying the thin diaphragm.

Referring to the drawings and in particular to Figs. 1 and 2, the covering of the invention includes a resilient rubber base 10 having spaced stubs 11 protruding from one face thereof, and a thin rubber diaphragm 12 which is adhered to the upper surfaces of the stubs 11. A damping liquid 13 occupies the channel spaces between the stubs, and the unit is sealed at its edges by a rubber damming strip 14 which is adhered to the base and the diaphragm or which may be formed integrally with the base. In use, the base 10 is normally adhered to the object to be covered and the diaphragm 12 therefore forms the outer surface of the object.

The stubs 11 may be made separately and adhered to the base with a suitable adhesive such as a rubber cement or by the natural tack of the uncured rubber Preferably, however, the stubs 11 are formed as an integral part of the base 10 by molding the stubs and base in accordance with conventional molding practice in a suitable mold such as shown in Fig. 3. Such a mold would consist of a top plate T, a base plate B, a perforated core place C, and a spacer frame S. The stubs 11 would be formed in the perforations P of the core plate C, and the base 10 in the space A. The desirability of forming the stubs 11 integrally with the base 10 is appreciated when it is realized that the stubs may be as small as 0.040" in diameter and spaced apart 0.100". If desired, the damming strip 14 may also be formed integrally with the base 10 by securing core plate C to top plate T by suitable fasteners and leaving a peripheral space around the plate C in which the damming strip may be formed.

In accordance with the present invention the rubber damming strip or strips 14 are placed around the peripheral edge of the base 10 as shown in Fig. 4 and the base filled with the damping liquid 13 to a depth substantially equal to the depth of the stubs 11. The damping liquid is then frozen by placing the unit on a piece of metal which in turn is placed upon a block of solid carbon dioxide, or by placing the unit in some suitable cooling medium. Once the damping liquid is frozen, the diaphragm 12 can be readily pressed upon the tops of the stubs 11 by a roller, or otherwise, and adhered thereto.

Optionally the base layer may be secured to a suitable mandrel, the base layer and mandrel cooled down below the freezing point of the damping fluid, and the mandrel with its base layer thereon rotated in the damping liquid to pick up the liquid and freeze the same in the spaces between the stubs. The base or the diaphragm or both may contain fabric reinforcement.

While the present invention contemplates also the fabrication of the covering from fully cured parts secured together by a suitable cement, the preferred method is to fabricate the unit from partially cured parts by adhering the parts together by their natural tack and then curing the resulting assembly in a mold of the proper shape and volume to give an integral bond between the parts.

In using partially cured parts it is helpful to coat the upper surfaces of the stubs 11 and the upper surfaces of the damming strip 14 with an oil, such as a purified petroleum oil, with a roller to prevent the damping liquid 13 from wetting the upper surfaces of the stubs 11 and strip 14 when the liquid is poured into the dammed base 10. After the damping liquid has been frozen, it can be leveled to the top surfaces of the stubs 11 by carefully wiping with a fine emery paper or a doctor blade. The top surfaces of the partially cured stubs 11 and strip 14 can then be wiped with gasoline to renew and increase the tack thereof to facilitate adhesion to the partially cured diaphragm 12, which is applied next.

From the above description it can be seen that there is provided an improved method of forming a liquid-filled covering, to be applied to an object to decrease the drag of the object in a fluid medium. Depending on the particular object, the base may be adhered to the object either before or after it has been filled and the diaphragm applied. Various damping liquids may be used. An aqueous solution of carboxymethyl cellulose is particularly useful as its viscosity can be easily controlled. The viscosity of the damping fluid is known to affect the drag resistance, and control of the viscosity is therefore important.

The term "rubber" is used in its generic sense to include natural rubber, synthetic rubbers, and blends thereof. By way of an example, not by limitation, a rubber compound of the following formulation may be used for all the parts if so desired:

| | Parts by weight |
|---|---|
| Smoked sheet | 100 |
| Carbon black | 20 |
| Acetone-diphenylamine condensate | 1 |
| s-Diphenyl-p-phenylenediamine | 4 |
| Zinc oxide | 5 |
| Stearic acid | 5 |
| Benzothiazyl disulfide | 0.5 |
| Dimethylammonium dimethyldithiocarbamate | 0.12 |
| Sulfur | 1.5 |

To give desired properties such a rubber may be cured at 100° C. for 90 minutes.

It is to be understood that the above description and accompanying drawings are for the purpose of illustration and not by way of limitation and that changes and modifications may be made therein without departing from the spirit and scope of the invention.

Having thus described my invention, what I claim and desire to protect by Letters Patent is:

1. The method of making a liquid-filled drag-reducing covering comprising forming a resilient rubber base capable of retaining a liquid thereon and having a plurality of spaced stubs extending upwardly therefrom, pouring onto said base a damping liquid to a depth substantially equal to the height of said stubs, thereafter freezing said liquid and while said liquid is frozen adhering a rubber covering sheet to the top surfaces of said stubs and to the periphery of said base to enclose said liquid.

2. The method as in claim 1 in which the base, stubs and covering sheet are of partially cured rubber, the covering sheet is adhered to the top of the stubs by natural tack, and the curing of the assembly with the liquid therein is subsequently completed.

3. The method as in claim 1 in which the stubs are molded integrally with the base and a resilient rubber damming strip is provided around the periphery of the base.

4. The method as in claim 1 in which the top surfaces of the stubs and and the periphery of the base are coated with an oil, the damping liquid is poured on and frozen, and the top surfaces of the stubs and the periphery are thereafter wiped with a solvent to remove the oil and renew the tack of said surfaces to facilitate adhesion of the covering layer to said surfaces.

No references cited.